(12) United States Patent
Zhu et al.

(10) Patent No.: US 10,549,749 B2
(45) Date of Patent: Feb. 4, 2020

(54) POST COLLISION ANALYSIS-BASED VEHICLE ACTION OPTIMIZATION FOR AUTONOMOUS DRIVING VEHICLES

(71) Applicants: Baidu USA LLC, Sunnyvale, CA (US); Baidu.com Times Technology (Beijing) Co., Ltd., Beijing (CN)

(72) Inventors: Fan Zhu, Sunnyvale, CA (US); Qi Kong, Sunnyvale, CA (US); Hui Jiang, Sunnyvale, CA (US)

(73) Assignees: BAIDU USA LLC, Sunnyvale, CA (US); BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 94 days.

(21) Appl. No.: 15/772,523

(22) PCT Filed: Mar. 8, 2018

(86) PCT No.: PCT/CN2018/078422
§ 371 (c)(1),
(2) Date: Apr. 30, 2018

(87) PCT Pub. No.: WO2019/169603
PCT Pub. Date: Sep. 12, 2019

(65) Prior Publication Data
US 2019/0276012 A1    Sep. 12, 2019

(51) Int. Cl.
*B60W 30/085*  (2012.01)
*B60W 30/095*  (2012.01)
(Continued)

(52) U.S. Cl.
CPC ...... *B60W 30/085* (2013.01); *B60W 30/0953* (2013.01); *B60W 30/0956* (2013.01);
(Continued)

(58) Field of Classification Search
None
See application file for complete search history.

(56) References Cited

U.S. PATENT DOCUMENTS 5,983,161 A * 11/1999 Lemelson ............... G01S 19/11
340/436
6,748,325 B1 * 6/2004 Fujisaki ................. G01C 21/00
701/301
(Continued)

*Primary Examiner* — Shelley Chen
(74) *Attorney, Agent, or Firm* — Womble Bond Dickinson (US) LLP

(57) ABSTRACT

It is determined an ADV is inevitable to collide with at least one of the objects surrounding the ADV based on the relative positions and speeds between the ADV and the objects in view of the physical dimensions of the ADV. An object may be another vehicle, a pedestrian, a bicycle, a static obstacle. For each of the objects, a collision cost between the ADV and the object is calculated using a set of one or more cost functions or cost algorithms. A collision cost represents an amount of potential damage if the collision is to occur. One of the objects is selected whose collision cost is the least amongst the objects. A path or trajectory is planned for the ADV leading or towards to the selected object to minimize the potential damage when the ADV potentially collide with the selected object compared to the remaining objects.

21 Claims, 11 Drawing Sheets

(51) Int. Cl.
*G05D 1/00* (2006.01)
*G05D 1/02* (2020.01)

(52) U.S. Cl.
CPC ......... *G05D 1/0088* (2013.01); *G05D 1/0214* (2013.01); *G05D 2201/0213* (2013.01)

(56) References Cited

U.S. PATENT DOCUMENTS

| | | | | |
|---|---|---|---|---|
| 10,019,006 | B2* | 7/2018 | Shah | G05D 1/0206 |
| 10,106,156 | B1* | 10/2018 | Nave | B60K 28/14 |
| 10,168,703 | B1* | 1/2019 | Konrardy | G07C 5/006 |
| 10,235,886 | B1* | 3/2019 | Baughman | B60W 30/08 |
| 10,345,815 | B2* | 7/2019 | Lv | G05D 1/0246 |
| 2003/0061002 | A1* | 3/2003 | Steinbrecher | G01S 11/16 |
| | | | | 702/159 |
| 2011/0035086 | A1* | 2/2011 | Kim | G05D 1/0217 |
| | | | | 701/23 |
| 2017/0248953 | A1* | 8/2017 | Kelley | B62D 15/0265 |
| 2018/0074505 | A1* | 3/2018 | Lv | B60W 30/12 |
| 2018/0102001 | A1* | 4/2018 | Faust | G05D 1/0088 |
| 2018/0152628 | A1* | 5/2018 | Patel | B60R 1/00 |

* cited by examiner

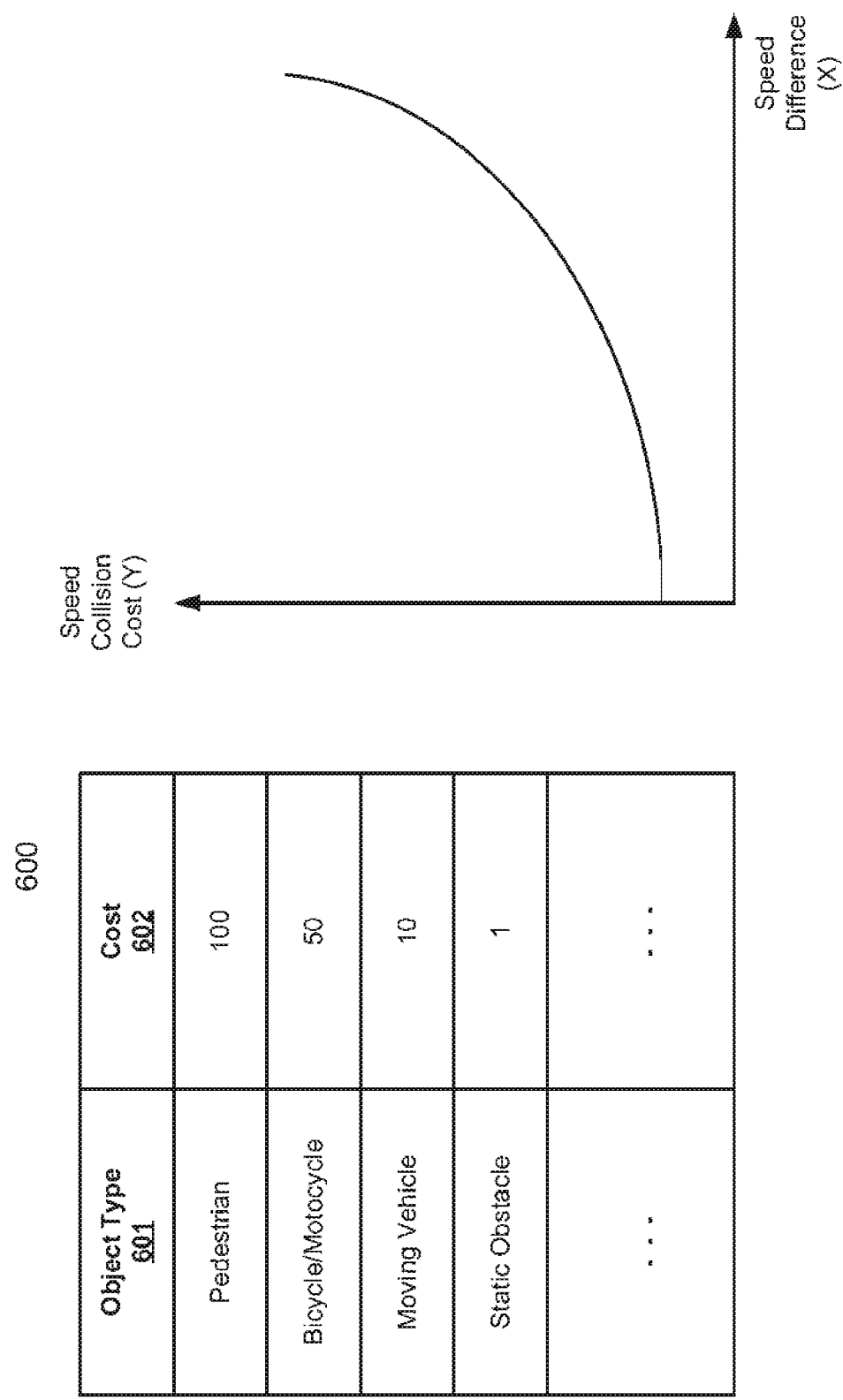

POST COLLISION ANALYSIS-BASED VEHICLE ACTION OPTIMIZATION FOR AUTONOMOUS DRIVING VEHICLES

CROSS-REFERENCE TO RELATED APPLICATION

This patent application is a U.S. National Phase Application under 35 U.S.C. § 371 of International Application No. PCT/CN2018/078422, filed Mar. 8, 2018, entitled "POST COLLISION ANALYSIS-BASED VEHICLE ACTION OPTIMIZATION FOR AUTONOMOUS DRIVING VEHICLES," which is incorporated by reference herein by its entirety.

TECHNICAL FIELD

Embodiments of the present disclosure relate generally to operating autonomous vehicles. More particularly, embodiments of the disclosure relate to post collision vehicle action optimization for autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. The goal of autonomous driving is to plan and navigate the roads from a starting location to a destination location following the traffic rules and avoid any collision as much as possible. However, under certain circumstances, an accident or collision is inevitable due to the unforeseen or sudden change of the driving environment. Typically, conventional vehicles would slow or stop the vehicles as soon as possible while maintaining the same heading direction forwardly under such scenario. However, such an approach may not be the best way to cause the least damages.

SUMMARY

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, during the autonomous driving, the primary goal is to avoid any collision or accident with other objects while following the traffic rules as much as possible. However, when an autonomous driving vehicle (ADV) determines that a collision or accident cannot be avoided, the surrounding driving environment is examined and analyzed at the point in time to determine an action to take to reduce the possible damage due to the unavoidable collision or accident. A number of paths or trajectories may be determined, where each path or trajectory may be associated with a cost representing an amount of damage that will likely incur if the ADV is to follow that particular path, using one or more cost functions or cost algorithms given the driving environment at the point in time. One of the paths or trajectories with the least cost may be selected and the ADV is controlled to drive according to the selected path, such that the potential damage may be greatly reduced due to the inevitable collision.

According to one embodiment, it is determined an ADV is inevitable to collide with at least one of the objects surrounding the ADV based on the relative positions and speeds between the ADV and the objects in view of the physical dimensions of the ADV. An object may be another vehicle, a pedestrian, a bicycle, a static obstacle (e.g., a trash can, light pole, building, parked vehicle). For each of the objects, a collision cost between the ADV and the object is calculated using a set of one or more cost functions or cost algorithms. A collision cost represents an amount of potential damage if the collision is to occur. One of the objects is selected whose collision cost is the least amongst the objects. A path or trajectory is planned for the ADV leading or towards to the selected object to minimize the potential damage when the ADV potentially collide with the selected object compared to the remaining objects.

In one embodiment, the collision cost may be determined based on an object collision cost associated with an object based on the type of the object. A type of an object may be a vehicle, human or pedestrian, a bicycle or motorcycle with rider, or a static obstacle. Each type of object may be predefined and associated with a particular object collision cost. In one embodiment, an object to object collision cost (object/cost) mapping data structure or mapping table is maintained to map different types of objects to different collision costs. The object/cost mapping table includes a number of mapping entries. Each mapping entry maps a particular object type to a particular object collision cost. Given a particular object perceived during the autonomous driving, the type of the object is determined, for example, based on the image of the object captured by a sensor (e.g., camera). Based on the type of the object, a lookup operation is performed in the object/cost mapping table to locate a mapping entry that matches the type of the object. An object collision cost is then obtained from the matching entry.

According to another embodiment, the collision cost between the ADV and an object may include a speed collision cost that is calculated based on a difference between the speed of the ADV and the speed of the object. The collision cost between the ADV and an object may further include a direction collision cost that is calculated based on the directional vector of the ADV and the directional vector of the object, such as, for example, an angle between the directional vectors of the ADV and the object. The collision cost between the ADV and an object may further include a hitting location collision cost that is determined based on a hitting or contact location of the potential collision with the object with respect to a driver seat of the ADV. The final collision cost between the ADV and the object may be calculated based on one or more of an object collision cost, a speed collision cost, a direction collision cost, and a hitting location collision cost, for example, using a predetermined combine formula (e.g., weighted formula).

BRIEF DESCRIPTION OF THE DRAWINGS

Embodiments of the disclosure are illustrated by way of example and not limitation in the figures of the accompanying drawings in which like references indicate similar elements.

FIGS. 6A-6D are diagrams illustrating examples of certain cost functions or tables according to one embodiment.

DETAILED DESCRIPTION

Figure 1:
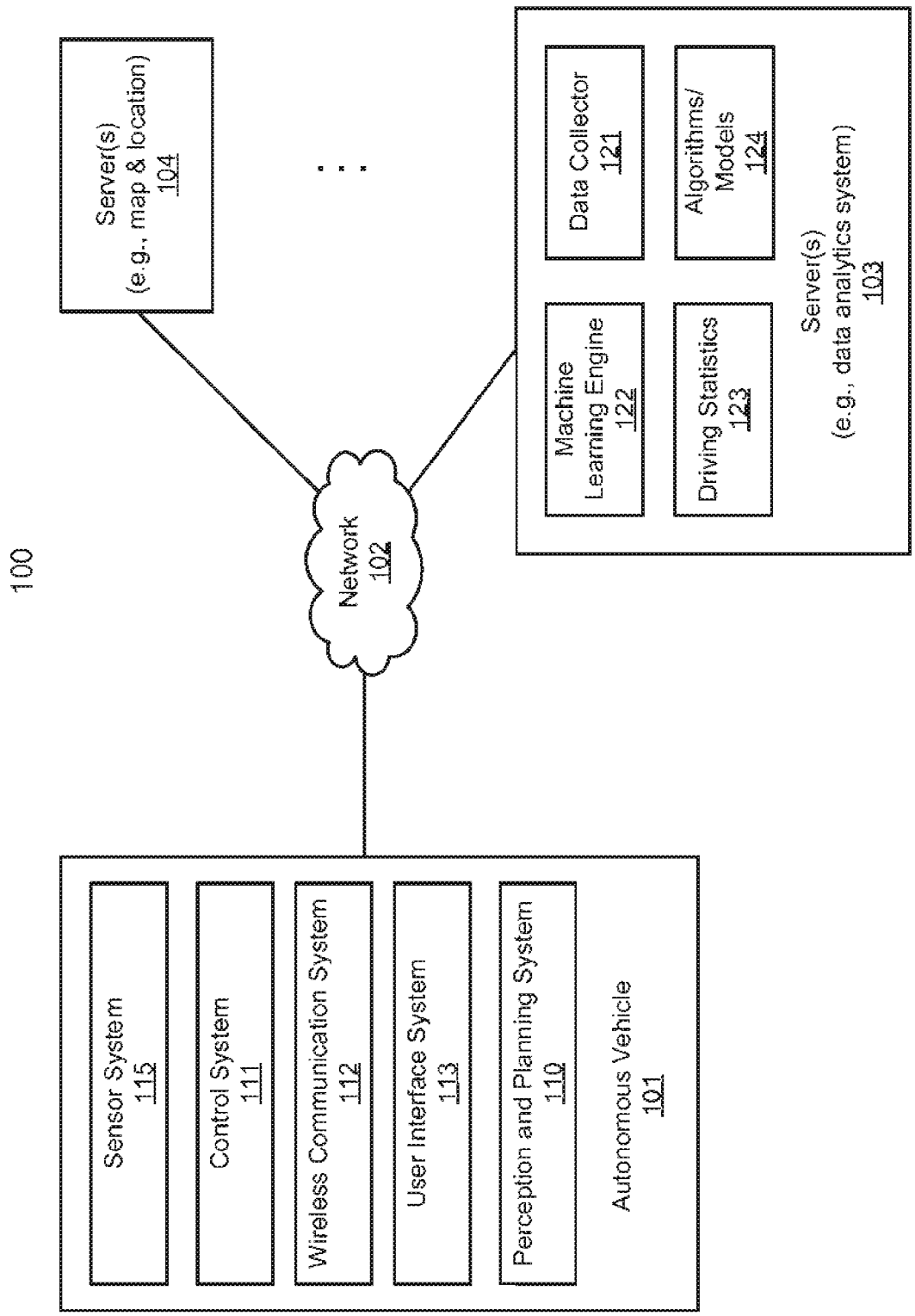
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
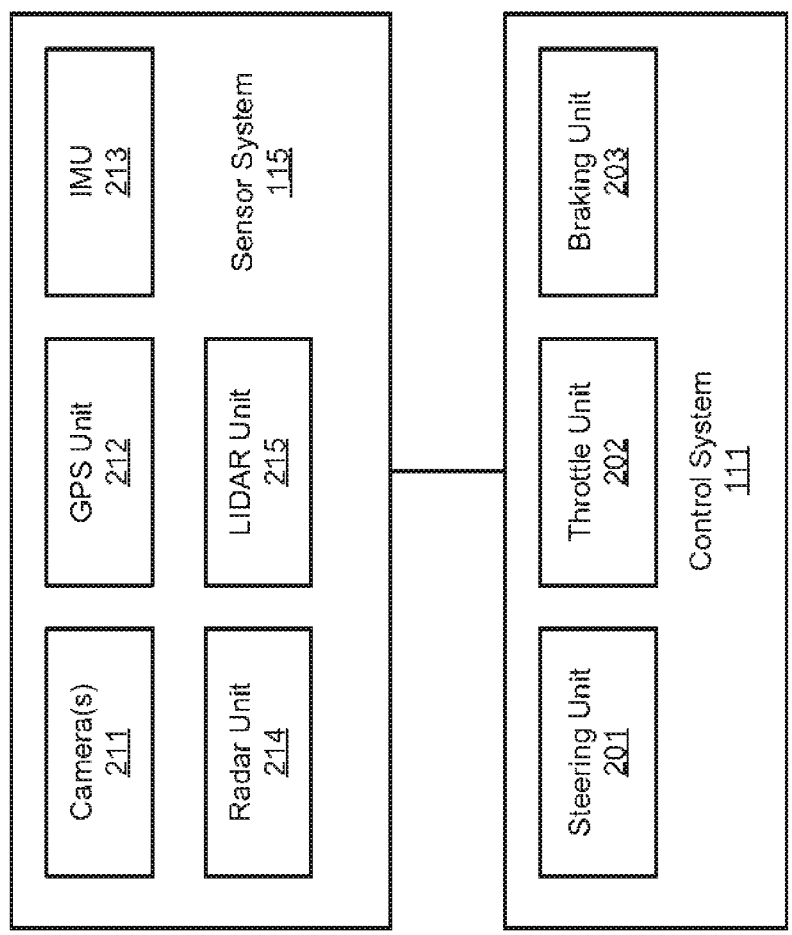
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include algorithms, cost functions, and/or cost mapping tables to calculate an object collision cost, a speed collision cost, a direction collision cost, and/or a hitting location collision cost, as well as an algorithm to determine a total collision cost based on one or more of the object collision cost, speed collision cost, direction collision cost, and hitting location collision cost. At least some of the algorithms or cost functions 124 can be uploaded to the ADVs to be utilized at real-time to calculate a path to minimize the collision damage under the circumstances.

Figure 3A:
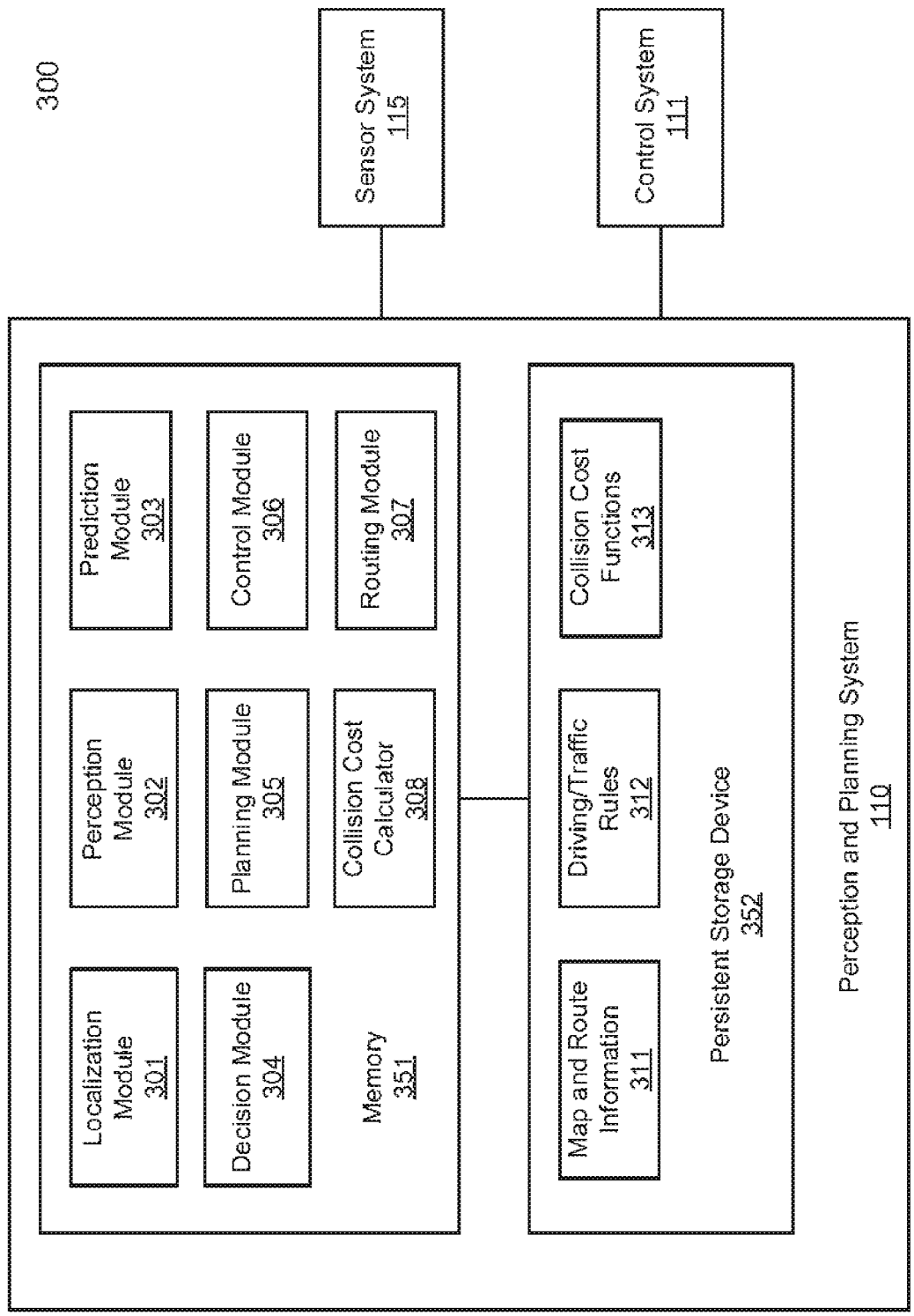
FIGS. 3A-3B are block diagrams illustrating an example of a perception and planning system used with an autonomous vehicle according to one embodiment.
Figure 3B:
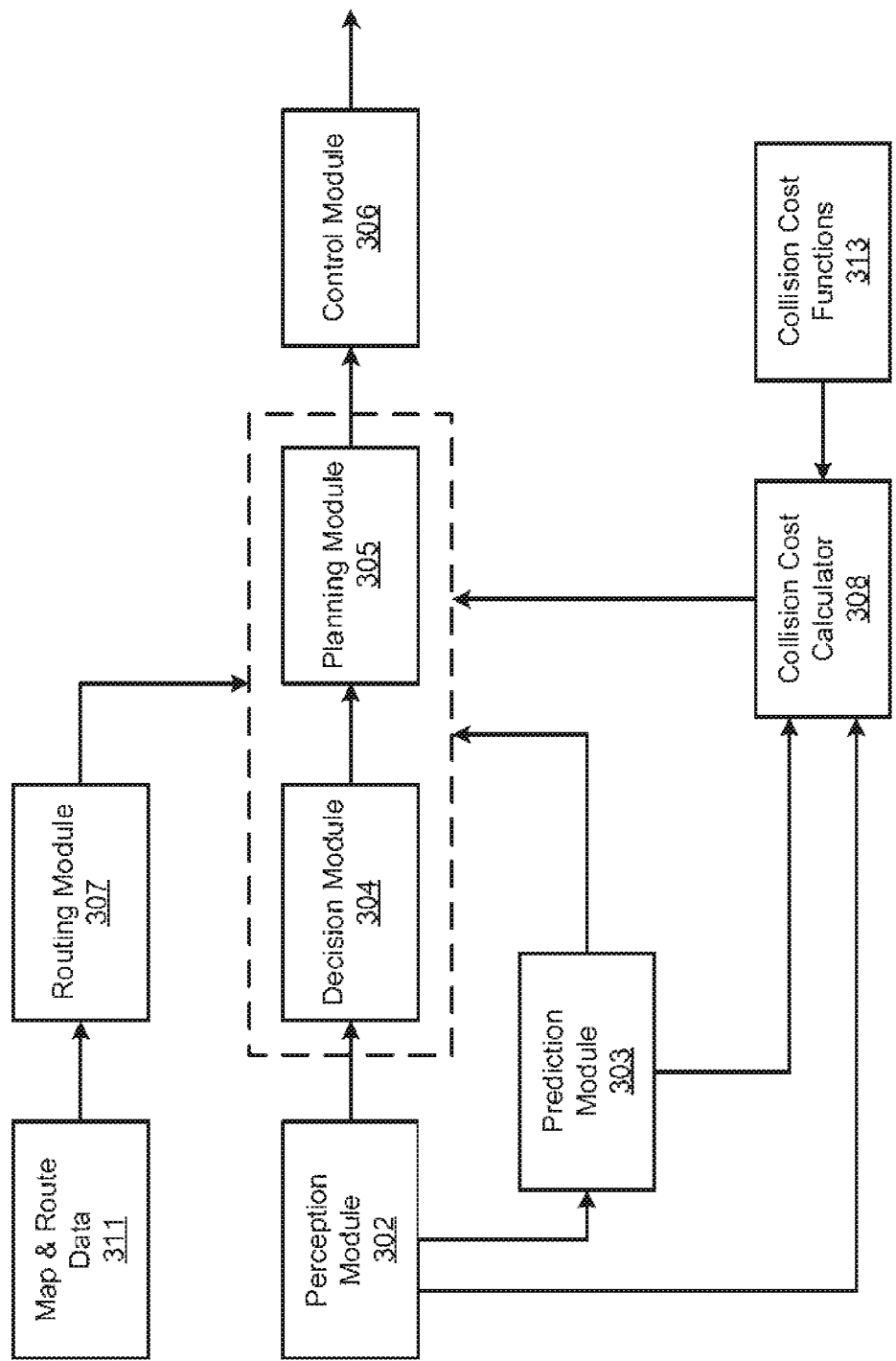

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and collision cost calculator 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module. For example, collision cost calculator 308 may be implemented as a part of planning module 305 and/or control module 306.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal route in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 11, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

According to one embodiment, when planning module 305 attempts to plan a path to navigate the traffic, it may determine that a collision with at least one of the objects surrounding the ADV may be inevitable. Planning module 305 may determine such a situation in view of the operating state of the ADV (e.g., speed and heading direction) in view of the surrounding driving environment. For example, given the current speed of the ADV, if the vehicle in front suddenly slows down with an unusual deceleration rate, even if a maximum brake command is issued, the ADV may still collide with the vehicle ahead. Similarly, given the speed of the ADV, if a following vehicle approaches with an unusual acceleration rate that even if the ADV is given a maximum throttle command with a maximum acceleration rate, the ADV still cannot escape from the collision with the vehicle from behind.

In response to determining that a collision is inevitable, collision cost calculator 308 is invoked to calculate a collision cost for each of the objects surrounding the ADV, for example, using cost functions 313. Cost functions 313 may be created and trained by data analytics system 103 based on the driving statistics collected from a variety of vehicles driving on a variety of roads. One of the objects with the least collision cost may be selected by planning module 305. Planning module 305 plans a path towards the selected object to collide with the selected object. As a result, the damage caused by the collision is kept minimum compared with the damage from the collisions with other objects.

Figure 4:
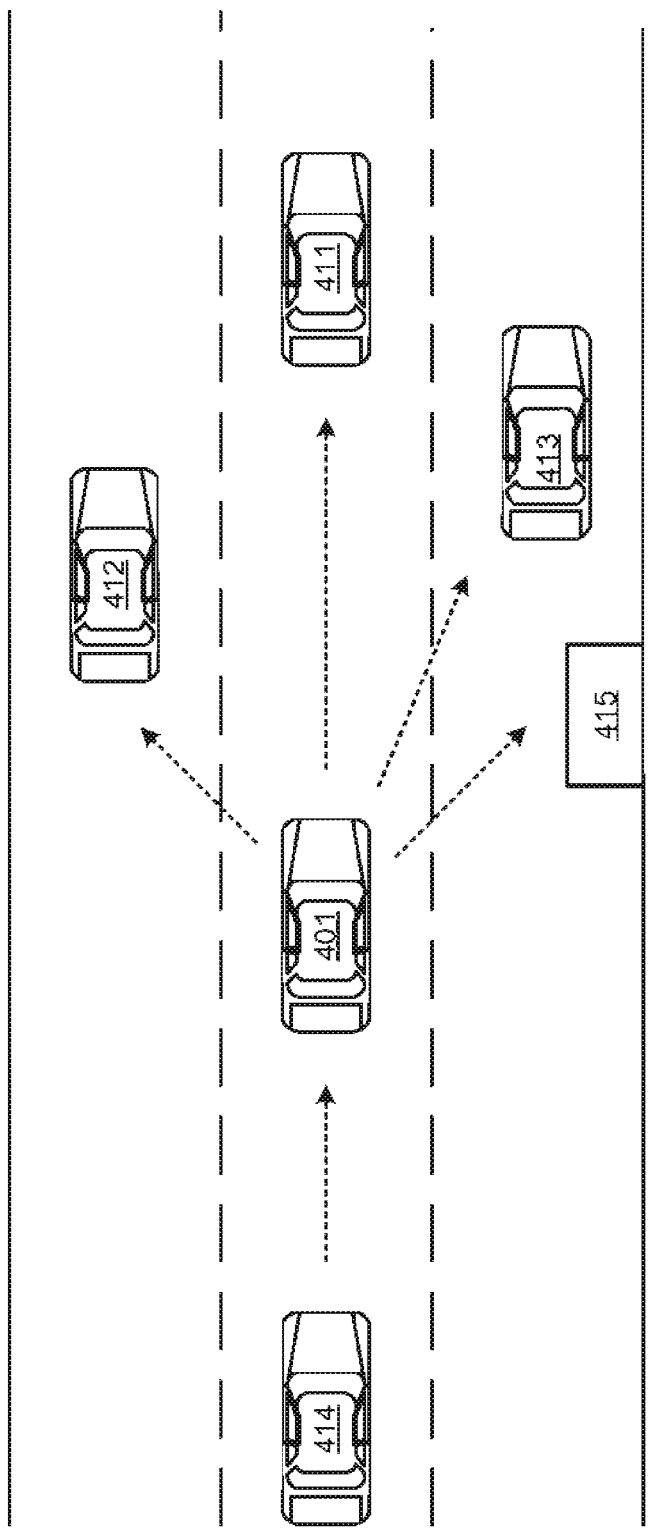
FIG. 4 is a diagram illustrating a specific driving environment.

FIG. 4 shows an example of a particular driving environment. Referring to FIG. 4, in this example, ADV 401 is surrounded by objects 411-415. Planning module 305 of ADV 401 may determine that a collision with at least one of the objects 411-415 cannot be avoided based on the perception information of the driving environment provided by perception module 302 and prediction of how the objects 411-415 may behave provided by prediction module 303. For example, based on the difference between the speed of ADV 401 and the speed of vehicle 411 in front given the current distance between them, ADV 401 will most likely collide with vehicle 411 event if a maximum brake command it issued to ADV 401. Meanwhile there are objects 412-413 and 415 on the adjacent lanes. If ADV 401 attempts to change lane, ADV 401 most likely will collide with one of the objects 412-413 or 415.

Similarly, given the difference between the speed of ADV 401 and vehicle 414 approaching from behind and the given distance between them, ADV 401 may determine that vehicle 414 will most likely collide the backend of ADV 401. In order to avoid the collision, ADV 401 may have to accelerate forwardly. Even if a maximum throttle command is applied to ADV 401 to accelerate, vehicle 414 nevertheless will collide with the backend of ADV 401. In addition, there is another vehicle 411 upfront and if ADV 401 accelerates too much, ADV 401 may collide with vehicle 411. If ADV 401 wants to change lanes, it may have to collide with at least one of the objects 412-413 and 415. Thus, a collision is inevitable and it is just a matter of which of objects 411-415 that ADV 401 collides with would cause the least damage.

According to one embodiment, collision cost calculator 308 is configured to calculate a collision cost for each of objects 411-415 using a set of cost functions or cost algorithms 313. Thus, there will be a collision cost calculated for each of objects 411-415. The collision cost of an object is calculated based on the type of the object, the speed of the object, the heading direction of the object, and/or the collision spot of the vehicle. Based on the collision costs associated with objects 411-415, planning module 305 selects one of the objects 411-415 having the least collision cost and plans a path towards the selected object, such that ADV 401 will collide with the selected object. For example, if it is determined object 415 has the minimum collision cost amongst all the objects 411-415. In this example, it is assumed object 415 is a static obstacle such as light pole or trash can. Planning module 305 selects object 415 and plans a path or trajectory to allow ADV 401 to collide with object 415. The goal of such planning is to enable the ADV to collide with an object that would cause injury to people as minimum as possible or no injury at all.

Figure 5:
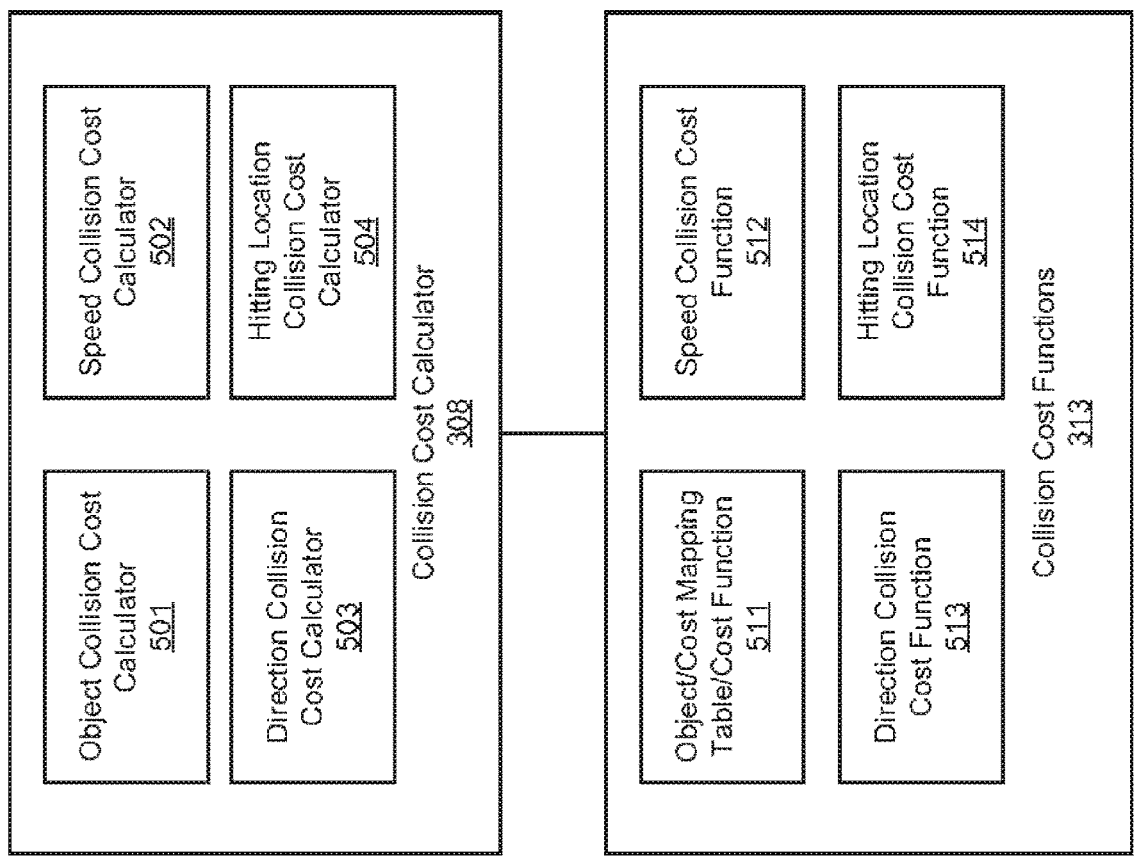
FIG. 5 is a block diagram illustrating an example of a collision cost calculator according to one embodiment.

FIG. 5 is a block diagram illustrating a collision cost calculator according to one embodiment. Referring now to FIG. 5, collision cost calculator 308 includes an object collision cost calculator 501, speed collision cost calculator 502, direction collision cost calculator 503, and hitting location collision cost calculator 504. Object collision cost calculator 501 is configured to calculate an object collision cost for a collision between the ADV and an object based on the type of the object. In one embodiment, object collision cost calculator 501 calculates the object collision cost using an object to collision cost (object/cost) mapping table 511. Object/cost mapping table 511 is configured to map different types of objects to corresponding collision cost.

FIG. 6A shows an example of object/cost mapping table according to one embodiment. Referring to FIG. 6A, object/cost mapping table 600 includes a number of mapping entries. Each mapping entry maps a particular type of object 601 to a corresponding collision cost 602. As shown in FIG. 6A, the collision cost for an object associated with a person will be higher than a static obstacle. In this example, the collision cost associated with a pedestrian is higher than a static obstacle, because a collision with a pedestrian will most likely cause injury to the pedestrian, while a collision with a static obstacle will most likely not cause injury to anyone. Similarly, the collision cost of a pedestrian is higher than a vehicle. The rationale behind is that the driver or passenger within a vehicle would have a better protection from the frame of the vehicle and the potential injury is lower than the collision with a pedestrian. Any collision that may cause human injury will have a higher collision cost.

Referring back to FIG. 5, speed collision cost calculator 502 is configured to calculate a speed collision cost between an ADV and an object based on the difference between the speed of the ADV and the speed of the object using speed collision cost function 512. Speed collision cost function 512 can be represented by a curve similar to the one as shown in FIG. 6B. The speed collision cost function may be represented by $y=a*e^{bx}+c$, where x represents the difference of the speeds and y represents the speed collision cost. Coefficients a, b, and c can be trained and configured based on the driving statistics in the past. As shown in FIG. 6B, higher speed difference leads to higher speed collision cost, because the collision impact will be larger if the speed difference is higher.

Figure 6D:
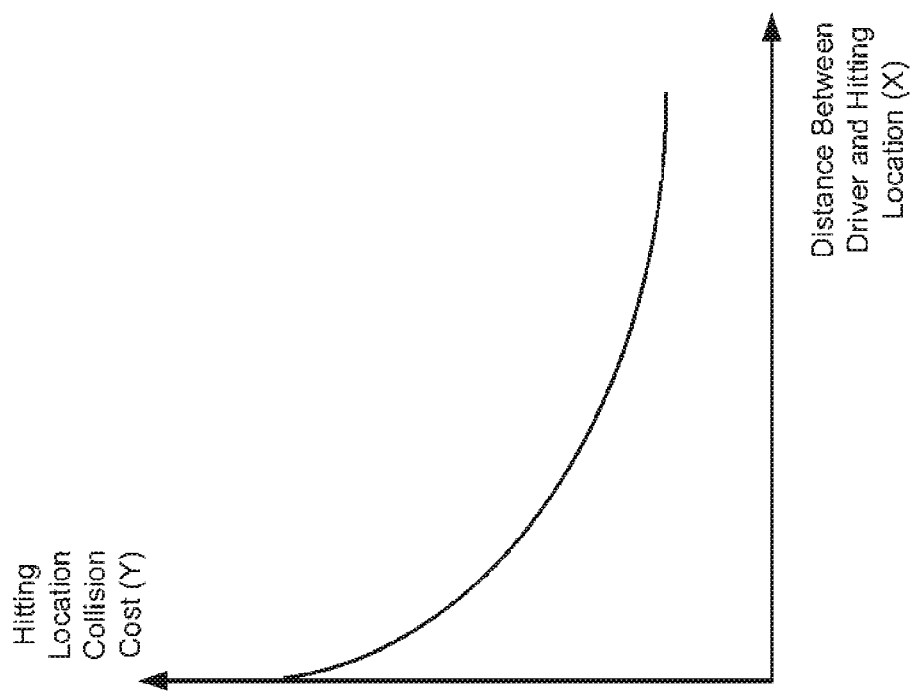
Figure 6C:
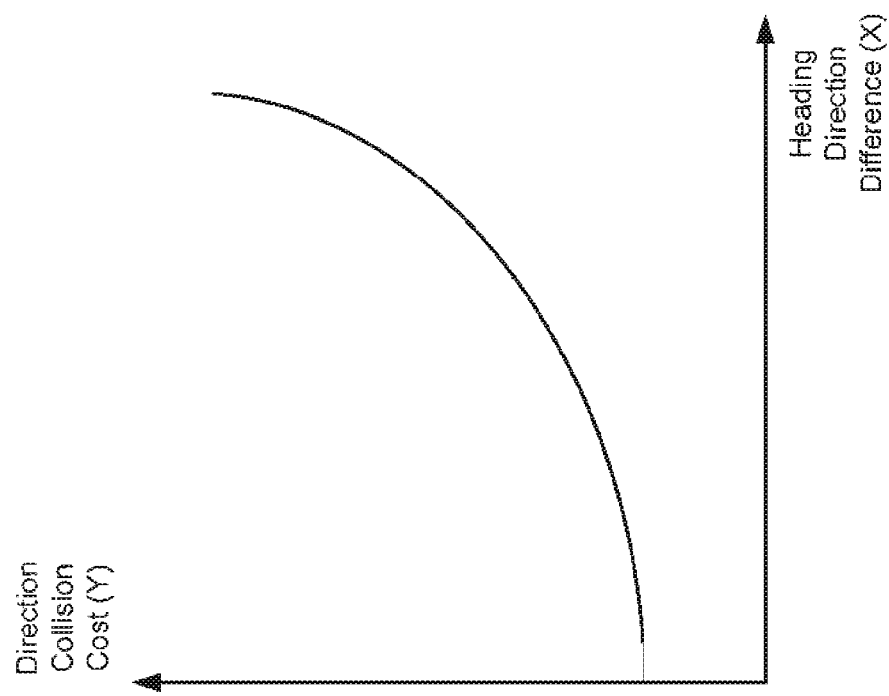

In one embodiment, direction collision cost calculator 503 is configured to calculate a direction collision cost between an ADV and an object based on the difference between the heading direction of the ADV and the heading direction of the object using direction collision cost function 513. The heading direction of a static obstacle will be considered as the same direction as the direction of the lane or road in which the static obstacle is located, since the static obstacle is not moving. Direction collision cost function 513 can be represented by a curve similar to the one as shown in FIG. 6C. The direction collision cost function may be represented by $y=a*e^{bx}+c$, where x represents the difference of the heading directions and y represents the direction collision cost. Coefficients or parameters a, b, and c can be trained and configured based on the driving statistics in the past. As shown in FIG. 6C, higher heading direction difference leads to higher direction collision cost, because the collision impact will be larger if the heading direction difference is higher.

In one embodiment, hitting location collision cost calculator 504 is configured to calculate a hitting location collision cost based on the potential hitting or impact location of the collision between an ADV and an object using hitting location collision cost function 514. Specifically, according to a particular embodiment, the hitting location collision cost is determined based on a distance between a driver or passenger of the ADV and the hitting or impact location on the ADV when a potential collision occurs. Hitting location collision cost function 514 can be represented by a curve similar to the one as shown in FIG. 6D. The hitting location collision cost function may be represented by $y=a*e^{b/x}+c$, where x represents the heading direction difference. Coefficients or parameters a, b, and c can be trained and configured based on the driving statistics in the past. In a specific embodiment, the hitting location collision cost function is represented by $y=e^{1/x}-1$. As shown in FIG. 6D, a larger distance between a driver or passenger of the ADV and the hitting location of the ADV leads to a lower cost, because the potential damage to the driver or passenger will be lower.

The above hitting location collision cost is referred to as a self-hitting location collision cost, which is based on the distance between a driver or passenger of the ADV and the hitting location of the ADV. According to one embodiment, an object hitting location collision cost is also calculated based on the distance between the hitting location of the object and the rider or passenger of the object. If the object is a vehicle, it is assumed there is at least the driver riding in the vehicle. If the object is a static object, the object hitting location collision cost is zero. The total hitting location collision cost is determined based on the self-hitting and object hitting location collision costs using a predetermined formula, for example, by summing and/or multiplying the both hitting location collision costs.

According to one embodiment, the total or final collision cost is determined based on the object collision cost, the speed collision cost, the direction collision cost, and the hitting location collision cost using a predetermined formula (e.g., a weighted formula). In one particular embodiment, the total collision cost can be determined based on the following:

Total cost=object collision cost*hitting location collision cost*(speed collision cost+direction collision cost)

Figure 7:
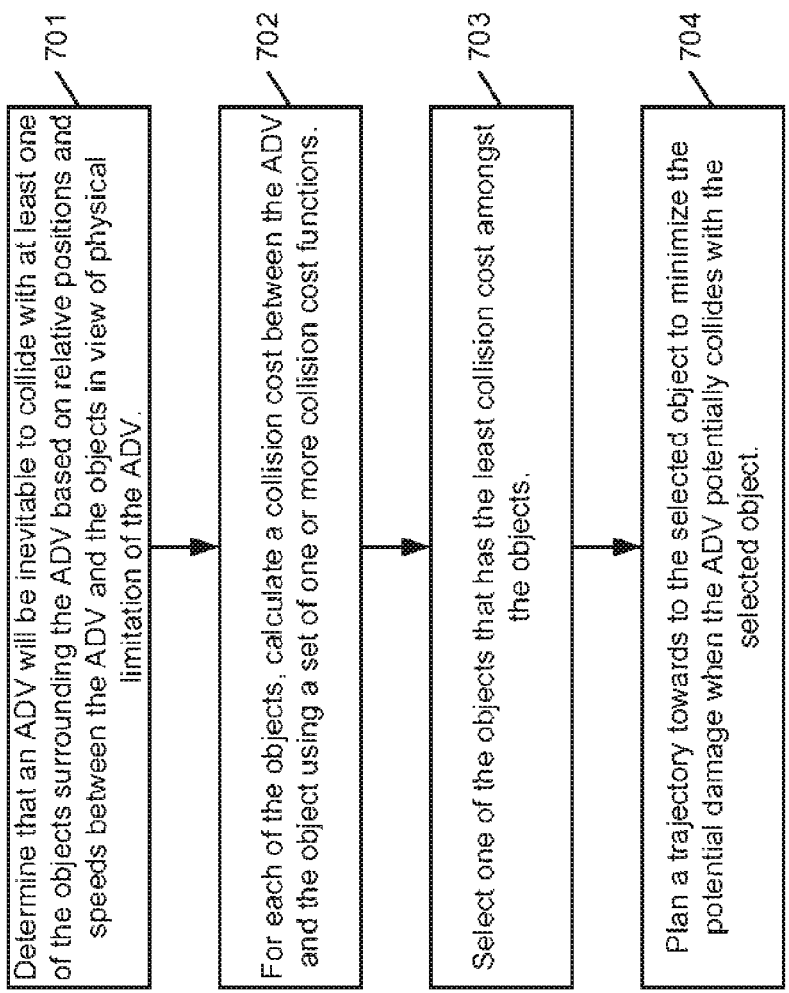
FIG. 7 is a flow diagram illustrating a process of operating an autonomous driving vehicle according to one embodiment.

FIG. 7 is a flow diagram illustrating a process of operating an autonomous driving vehicle according to one embodiment. Process 700 may be performed by processing logic which may include software, hardware, or a combination thereof. For example, process 700 may be performed by collision cost calculator 308. Referring to FIG. 7, in operation 701, it is determined that an ADV will be inevitable to collide with at least one of the objects surrounding the ADV based on the relative positions and speeds between the ADV and the objects in view of physical limitations of the ADV. The physical limitations of the ADV include the maximum acceleration or maximum deceleration of the ADV. In operation 702, for each of the objects, a collision cost is calculated between the ADV and the object using a set of one or more collision cost functions. The collision cost represents an amount of potential damage if the collision is to occur. In operation 703, one of the objects whose collision cost is the least amongst the objects is selected. In operation 704, a trajectory is planned towards to the selected object to minimize the potential damage when the ADV potentially collides with the selected object.

Figure 8:
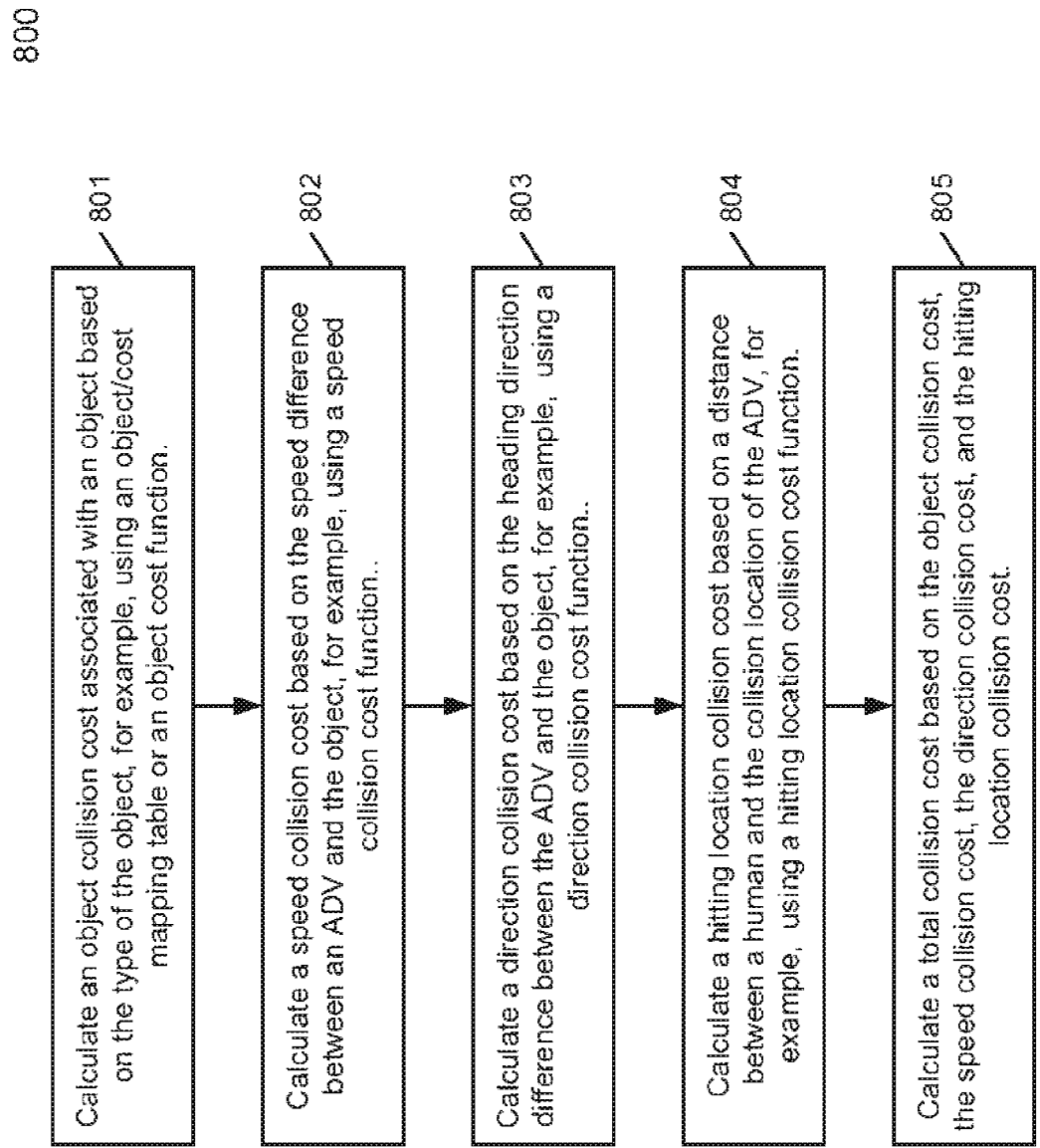
FIG. 8 is a flow diagram illustrating a process of calculating a collision cost with respect to an object according to one embodiment.

FIG. 8 is a flow diagram illustrating a process of calculating a collision cost associated with an object according to one embodiment. Process 800 may be performed as a part of operations involved in operation 702. Referring to FIG. 8, in operation 801, an object collision cost is calculated based on the type of the object. In one embodiment, based on the type of the object, a lookup operation is performed in an object/cost mapping table to obtain the object collision cost. In operation 802, a speed collision cost is calculated based on a speed difference between the ADV and the object using a speed collision cost function. In operation 803, a direction collision cost is calculated based on a heading direction difference between the ADV and the object using a direction collision cost function. In operation 804, a hitting location collision cost is calculated based on the hitting or impact location of the potential collision, using a hitting location collision cost function. The hitting location collision cost includes a self-hitting location collision cost and an object-hitting location collision cost. In operation 805, the total collision cost is determined based on the object collision cost, the speed collision cost, the direction collision cost, and the hitting location collision cost.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 9:
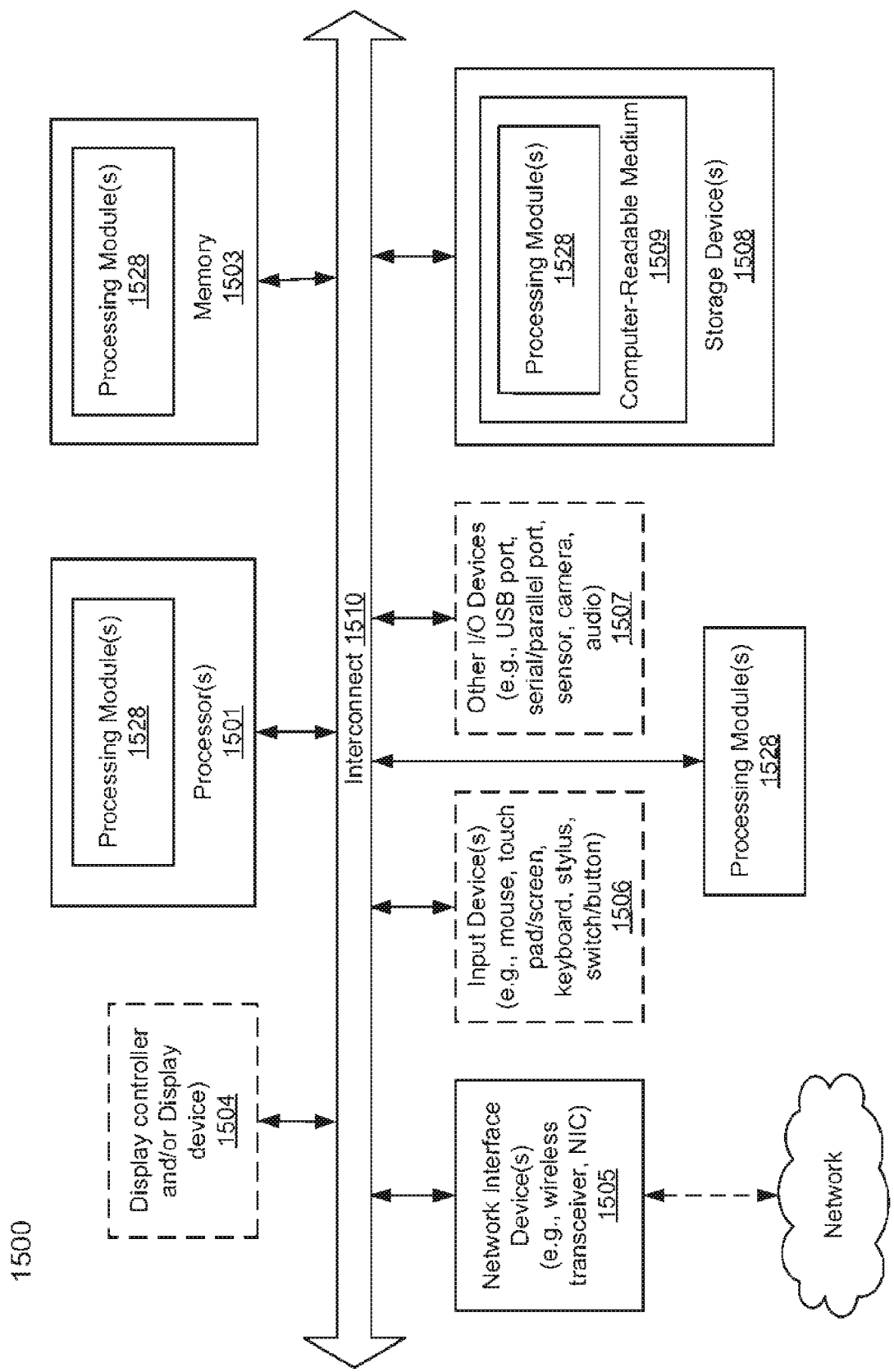
FIG. 9 is a block diagram illustrating a data processing system according to one embodiment.

FIG. 9 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, and/or collision cost calculator 308. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle, the method comprising:
   determining that an autonomous driving vehicle (ADV) will be inevitable to collide with at least one of a plurality of objects surrounding the ADV based on relative positions and speeds between the ADV and the objects in view of physical limitations of the ADV;
   for each of the objects, calculating a collision cost between the ADV and the object using a set of one or more cost functions, wherein the collision cost represents a potential damage if the collision is to occur;
   selecting one of the objects that has a least collision cost amongst the objects; and planning a trajectory towards to selected object to minimize the potential damage when the ADV potentially collides with the selected object compared to remaining objects.

2. The method of claim 1, wherein calculating a collision cost between the ADV and an object comprises determining an object collision cost based on a type of the object.

3. The method of claim 2, wherein determining an object collision cost comprises:
determining a type of the object based on perception information of the object; and
performing a lookup operation in an object to collision cost (object/cost) mapping table to locate a mapping entry matching the type of the object to obtain a predetermined collision cost corresponding to the type of the object.

4. The method of claim 3, wherein the object/cost mapping table comprises a plurality of mapping entries, and wherein each mapping entry maps a particular type of objects to a preconfigured collision cost.

5. The method of claim 2, wherein calculating a collision cost between the ADV and an object further comprises calculating a speed collision cost based on a difference between a first speed of the ADV and a second speed of the object.

6. The method of claim 2, wherein calculating a collision cost between the ADV and an object further comprises calculating a direction collision cost based on a first directional vector of the ADV and a second directional vector of the object.

7. The method of claim 2, wherein calculating a collision cost between the ADV and an object further comprises calculating a hitting location collision cost based on a hitting location of the potential collision with the object with respect to a driver seat of the ADV.

8. A non-transitory machine-readable medium having instructions stored therein, which when executed by a processor, cause the processor to perform operations, the operations comprising
determining that an autonomous driving vehicle (ADV) will be inevitable to collide with at least one of a plurality of objects surrounding the ADV based on relative positions and speeds between the ADV and the objects in view of physical limitations of the ADV;
for each of the objects, calculating a collision cost between the ADV and the object using a set of one or more cost functions, wherein the collision cost represents a potential damage if the collision is to occur;
selecting one of the objects that has a least collision cost amongst the objects; and
planning a trajectory towards to selected object to minimize the potential damage when the ADV potentially collides with the selected object compared to remaining objects.

9. The machine-readable medium of claim 8, wherein calculating a collision cost between the ADV and an object comprises determining an object collision cost based on a type of the object.

10. The machine-readable medium of claim 9, wherein determining an object collision cost comprises:
determining a type of the object based on perception information of the object; and
performing a lookup operation in an object to collision cost (object/cost) mapping table to locate a mapping entry matching the type of the object to obtain a predetermined collision cost corresponding to the type of the object.

11. The machine-readable medium of claim 10, wherein the object/cost mapping table comprises a plurality of mapping entries, and wherein each mapping entry maps a particular type of objects to a preconfigured collision cost.

12. The machine-readable medium of claim 9, wherein calculating a collision cost between the ADV and an object further comprises calculating a speed collision cost based on a difference between a first speed of the ADV and a second speed of the object.

13. The machine-readable medium of claim 9, wherein calculating a collision cost between the ADV and an object further comprises calculating a direction collision cost based on a first directional vector of the ADV and a second directional vector of the object.

14. The machine-readable medium of claim 9, wherein calculating a collision cost between the ADV and an object further comprises calculating a hitting location collision cost based on a hitting location of the potential collision with the object with respect to a driver seat of the ADV.

15. A data processing system, comprising:
a processor, and
a memory coupled to the processor to store instructions, which when executed by the processor, cause the processor to perform operations, the operations including
determining that an autonomous driving vehicle (ADV) will be inevitable to collide with at least one of a plurality of objects surrounding the ADV based on relative positions and speeds between the ADV and the objects in view of physical limitations of the ADV,
for each of the objects, calculating a collision cost between the ADV and the object using a set of one or more cost functions, wherein the collision cost represents a potential damage if the collision is to occur,
selecting one of the objects that has a least collision cost amongst the objects, and
planning a trajectory towards to selected object to minimize the potential damage when the ADV potentially collides with the selected object compared to remaining objects.

16. The system of claim 15, wherein calculating a collision cost between the ADV and an object comprises determining an object collision cost based on a type of the object.

17. The system of claim 16, wherein determining an object collision cost comprises:
determining a type of the object based on perception information of the object; and
performing a lookup operation in an object to collision cost (object/cost) mapping table to locate a mapping entry matching the type of the object to obtain a predetermined collision cost corresponding to the type of the object.

18. The system of claim 17, wherein the object/cost mapping table comprises a plurality of mapping entries, and wherein each mapping entry maps a particular type of objects to a preconfigured collision cost.

19. The system of claim 16, wherein calculating a collision cost between the ADV and an object further comprises calculating a speed collision cost based on a difference between a first speed of the ADV and a second speed of the object.

20. The system of claim 16, wherein calculating a collision cost between the ADV and an object further comprises calculating a direction collision cost based on a first directional vector of the ADV and a second directional vector of the object.

21. The system of claim 16, wherein calculating a collision cost between the ADV and an object further comprises calculating a hitting location collision cost based on a hitting location of the potential collision with the object with respect to a driver seat of the ADV.

* * * * *